United States Patent
Lee et al.

(10) Patent No.: US 10,363,837 B2
(45) Date of Patent: Jul. 30, 2019

(54) METHOD FOR CONTROLLING OPERATION OF ELECTRIC SEAT

(71) Applicant: HYUNDAI DYMOS INCORPORATED, Seosan-si, Chungcheongnam-do (KR)

(72) Inventors: Ho Cheoul Lee, Osan-si (KR); Seung Kyu Lee, Suwon-si (KR); Chang Won Lee, Osan-si (KR); Dong Gi Kim, Hwaseong-si (KR)

(73) Assignee: HYUNDAI DYMOS INCORPORATED, Seosan-si, Chungcheon (KR)

( * ) Notice: Subject to any disclaimer, the term of this patent is extended or adjusted under 35 U.S.C. 154(b) by 52 days.

(21) Appl. No.: 15/535,572

(22) PCT Filed: Dec. 23, 2015

(86) PCT No.: PCT/KR2015/014219
§ 371 (c)(1),
(2) Date: Jun. 13, 2017

(87) PCT Pub. No.: WO2016/108512
PCT Pub. Date: Jul. 7, 2016

(65) Prior Publication Data
US 2017/0334315 A1    Nov. 23, 2017

(30) Foreign Application Priority Data
Dec. 29, 2014   (KR) ................. 10-2014-0192515

(51) Int. Cl.
*B60R 22/00*    (2006.01)
*E05F 15/00*    (2015.01)
(Continued)

(52) U.S. Cl.
CPC ......... *B60N 2/0244* (2013.01); *B60N 2/0232* (2013.01); *B60N 2/04* (2013.01)

(58) Field of Classification Search
None
See application file for complete search history.

(56) References Cited

U.S. PATENT DOCUMENTS 6,949,904 B2 * 9/2005 Rumney ................ B60N 2/002
318/286

FOREIGN PATENT DOCUMENTS

JP    2002-234368 A    8/2002
JP    2006-347516 A    12/2006
(Continued)

OTHER PUBLICATIONS

International Search Report dated Apr. 6, 2016 of PCT/KR2015/014219 which is the parent application and its English translation—4 pages.

*Primary Examiner* — Abby Y Lin
*Assistant Examiner* — Kenny A. Taveras
(74) *Attorney, Agent, or Firm* — Knobbe Martens Olson & Bear LLP

(57) ABSTRACT

Provided a method for controlling the driving of an electric seat, the method including a step of detecting a motor driving signal of an electric seat; a stop determination step of determining whether the motor is forcibly terminated or normally terminated during the previous driving; and a driving step of driving the motor with a preset driving output value when previous driving of the motor is forcibly terminated.

4 Claims, 1 Drawing Sheet

(51) Int. Cl.
*G05D 1/00* (2006.01)
*G05D 3/00* (2006.01)
*G06F 7/00* (2006.01)
*G06F 17/00* (2019.01)
*B60N 2/02* (2006.01)
*B60N 2/04* (2006.01)

(56) References Cited

FOREIGN PATENT DOCUMENTS

| | | |
|---|---|---|
| JP | 2008-74527 A | 4/2008 |
| JP | 2013-102652 A | 5/2013 |
| KR | 10-2010-0036865 A | 4/2010 |
| KR | 10-2013-0039104 A | 4/2013 |

* cited by examiner

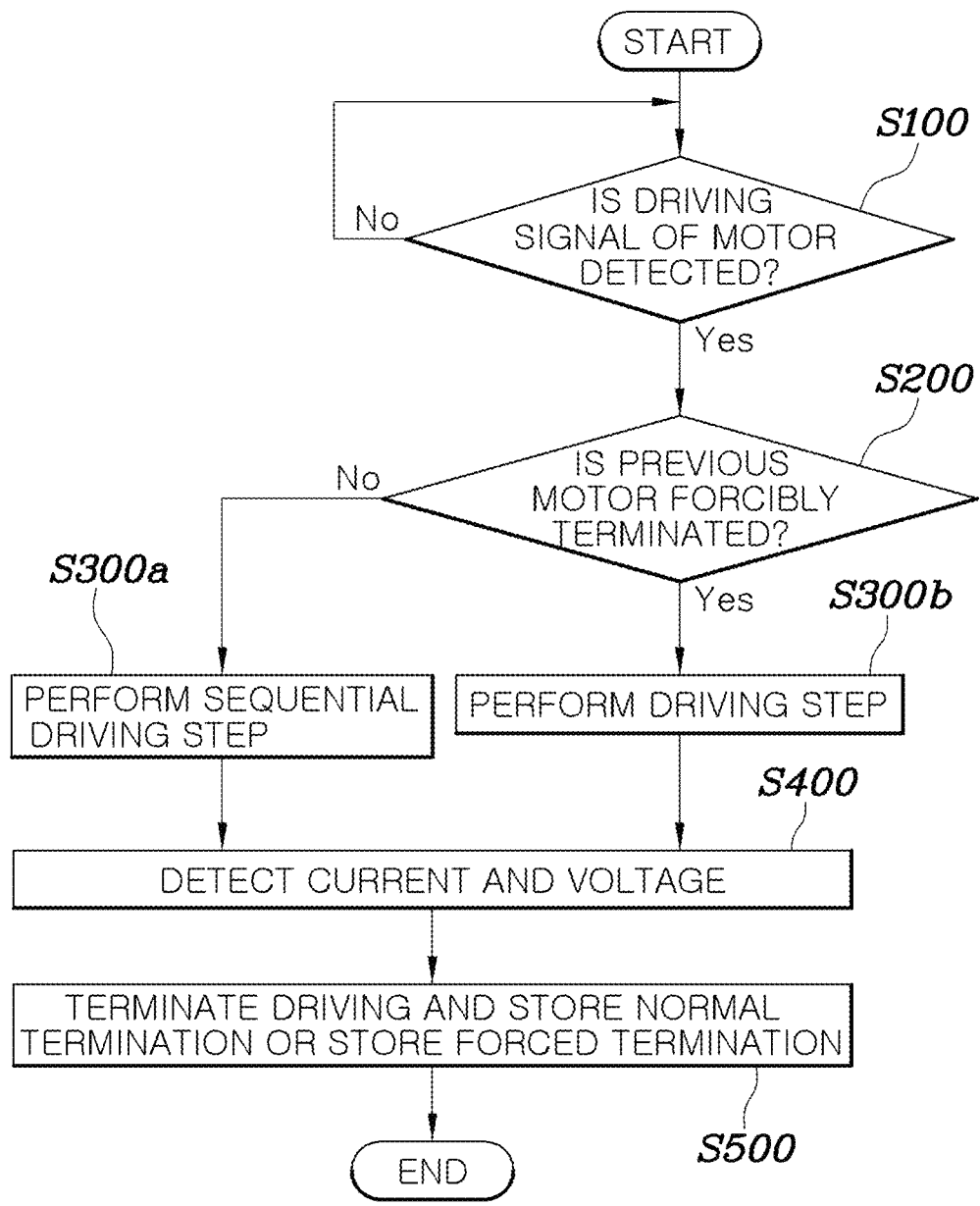

METHOD FOR CONTROLLING OPERATION OF ELECTRIC SEAT

TECHNICAL FIELD

The present invention relates to a drive control method for an electric seat that controls motor drive of an electric seat.

BACKGROUND ART

Generally, seats are provided in a car so that an occupant can sit on a front side and a rear side including the driver's seat, and the seats are configured to be movable forward and backward in a longitudinal direction of the vehicle so as to a comfortable state depending on the physical conditions of the occupant.

Conventionally, there are a manual method and an automatic method as the method of adjusting the position of the seat. The type of manually moving the seat maintains the state in which a seat frame is coupled to a vehicle body by a latch, and performs the position movement in a manner of releasing the catching by manual operation of a lever to apply a force to a required suitable position.

However, since such a manual seat moving apparatus makes a user feel uncomfortable and is extremely dangerous when it is necessary to move the seat during driving, recently, an automatic moving seat (hereinafter referred to as an "electric seat") which is easily moved by the switch operation has attracted attention.

The electric seat is provided to allow a posture change and movement using a motor, apart from the conventional mechanical operation. In addition, a driving posture memory system function which stores the seat's position and posture set by the user in advance for each user, and adjusts the position and posture to be suitable for the user only by simple operation when the user changes has been applied. Basically, the electric seat for achieving such a function is capable of moving the entire seat forward/backward (sliding forward/backward), is capable of moving the backrest forward/backward (reclining forward/backward), and is capable of adjusting the front and rear height of the seat (front height up/down, rear height up/down).

However, in achieving each function of the conventional electric seat, when reaching the terminal end of the rail during the forward and backward movement of the seat, there has been a case where jamming has occurred on the rail, or due to friction with the adjacent structure, there has been a case that an output shortage has occurred. In order to solve, when the output has been driven in the always maximum output state, there has been a problem that shock has occurred at the time of achievement of the function, hampering convenience.

The matters described as the above background art are for promoting the understanding of the background of the present invention and should not accepted to be admitted to correspond to the related art already known to those having ordinary knowledge in the technical field.

DISCLOSURE

Technical Problem

The present invention was devised to solve the conventional problems described above, and an object of the present invention is to provide a method for controlling an automatic seat which can quickly escape from the electric seat at the time of restriction of movement such as jamming of the seat, while performing a smooth entry at the time of achieving the function of the electric seat.

Technical Solution

According to the present invention, there is provided a method for controlling the driving of the electric seat, the method including a detecting step of detecting a motor driving signal of an electric seat; a stop determination step of determining whether the motor is forcibly terminated or normally terminated during the previous driving when the motor drive signal is detected; and a driving step of driving the motor with a preset driving output value when previous driving of the motor is forcibly terminated.

The method may further include a sequential driving step of controlling a plurality of turning on/off of the motor so that the motor is gradually driven, in the stop determination stage, when the previous driving of the motor is determined to be normally terminated by the user.

The sequential driving step may perform the motor with a preset normal output value, after controlling a plurality of turning on/off of the motor.

The driving step may drive the motor with a preset normal output lower than the driving output value after initial driving of the motor with the driving output.

The method may further include a step of detecting a current value and a voltage value of a motor; and a motor terminating step of forcibly terminating the operation of the motor and storing the forced termination signal when the voltage is applied during driving of the motor and the current value is equal to or greater than a preset limit current value.

The motor termination step may terminate the operation of the motor and may store the normal termination signal, when the voltage is not applied during driving of the motor and the current value is equal to or less than the preset normal current value.

The stop determination step may determine the forced termination or normal termination of the previous driving of the motor, based on whether the forced termination signal is stored or the normal termination signal is stored at the time of previous driving of the motor.

The drive output value may be a maximum output value of the motor.

Advantageous Effects

According to the drive control method of the electric seat having the structure as described above, in a situation where there is no risk of an occurrence of jamming, since the motor can gradually be driven, and the feeling of impact and recoil sound at the initial driving of the motor can be reduced.

In addition, in a situation where there is a risk of an occurrence of jamming, since it is possible to quickly escape from jamming, an occurrence of torque shortage phenomenon can be prevented, overheating of the motor and occurrence of failure of the electric seat can be prevented, and it is possible to prevent misunderstanding of failure and improve satisfaction degree and marketability.

DESCRIPTION OF DRAWINGS

The detailed description of the embodiments of the present application to be described below, and the aforementioned summary will be able to better understand when read in conjunction with the accompanying drawings. The embodiments are illustrated in the drawings for the purpose of illustrating the present invention. However, it should be understood that the present application is not limited to the illustrated precise arrangements and means.

FIG. 1 is a flowchart of a method for controlling driving of an electric seat according to an embodiment of the present invention.

EMBODIMENTS

Hereinafter, embodiments of the invention will be described in detail with reference to the accompanying drawings. The drawings attached hereto are to help explain exemplary embodiments of the invention, and the present invention is not limited to the drawings and embodiments.

Hereinafter, a method for controlling driving of an electric seat according to an embodiment of the present invention will be described with reference to the accompanying drawings.

FIG. 1 is a flowchart of a method for controlling the driving of an electric seat according to an embodiment of the present invention. The method for controlling the driving of the electric seat according to an embodiment of the present invention includes a step (S100) of detecting a motor driving signal of an electric seat; a stop determination step (S200) of determining whether the motor is forcibly terminated or normally terminated during the previous driving when the motor drive signal is detected; and a driving step (S300b) of driving the motor with a preset driving output value when previous driving of the motor is forcibly terminated.

In the present embodiment, the drive motor is preferably a motor which moves the entire electric seat in the longitudinal direction, but this is not necessarily the case, and in the embodiment described later, and the embodiment to be described later may be applied to all motors or driving devices used in the seat, such as a motor capable of moving the backrest of the electric seat forward/backward (recline forward/backward), or a motor capable of adjusting the front and rear heights of the seat (front height up/down, rear height up/down).

In the case of an electric seat that moves in the front-rear direction, a rail capable of mutually sliding is installed on a bottom surface of the seat and a floor of the vehicle so that the seat can be moved, and a motor for providing a driving force is provided so that the seat can slide with respect to the floor. An operation switch is provided so as to be able to operate the driving of the motor. However, when the seat reaches a movable extreme end in the front-rear direction while the seat moves in accordance with the operation of the operation switch, a jamming phenomenon may occur between the rails due to the driving force of the motor, and in this case, it is necessary to control the motor so as to forcibly escape from the jamming.

Therefore, in the detection step (S100), it is possible to detect the drive signal of the motor through whether to turn on/off the operation switch or the operation of the operation switch, and when the motor is determined to be forcibly terminated by the jamming of the rail during the previous driving of the motor in the stop determination step (S200), a driving step (S300b) of operating the motor to a preset driving output value is performed, thereby quickly leaving the jamming state so that it is possible to be quickly shifted to the driving state.

More specifically, a driving control method for an electric seat according to an embodiment of the present invention will be described.

When the drive signal of the motor is applied in the detection step (S100), in the stop determination step (S200), it is possible to determine whether the motor is forcibly terminated or is normally terminated during the previous driving. At this time, it is desirable to determine forced termination or normal termination, using the termination state at the time of recent motor termination in determining the state of the previous driving termination of the motor.

Whether the forced termination or the normal termination of the motor during the previous driving in the stop determination step (S200) can be determined by utilizing the termination record stored at the time of the termination of the previous driving of the motor, and to do so, a step (S400) of detecting the current value and the voltage value of the motor can be further executed. After the driving step (S300b) is executed, the voltage is applied during driving of the motor, when the current value is equal to or greater than the preset limit current value, a step (S500) of forcibly terminating the driving of the motor and storing the forcibly terminated signal may be further performed. The step (S400) of detecting the current value and the voltage value can be performed not only after the driving step (S300b) but also before or after the detection step (S100) or any other time.

In the motor termination step (S500), the limit current value is a value that can be determined to be in an immovable state such as a state in which the rail is currently jammed, and in a situation where the seat can no longer move, even if a current is applied to the motor, since the motor is not driven, the current load of the motor rises. When the value of the current load is equal to or greater than the limit current value, it is possible to determine that the current rail moves to the extreme distal end and enters the jamming state, and the rail can move no longer. Thus, the motor can be forcibly terminated, and the forcibly terminated state can be stored in another memory.

Therefore, at the above-mentioned stop determination step (S200), it is possible to determine that the forcible termination is performed during previous driving of the motor by reading the latest termination state stored in advance from the memory, and thus, it is possible to operate the motor at a preset driving value so that the rail can quickly escape from the jamming state.

In the jamming state, since there is a need for an output value much more than the normal output value during normal motor drive, it is desirable that the drive output value be a value greater than the preset normal output value, preferably, the maximum output value of the motor. In proportion to this, it is also possible to set the applied current value necessary for achieving each output value. The drive output value may be an output value that can escape from the jamming state, and the normal output value may be the output value required during the movement of the seat, and each output value be variously set in accordance with the intention of the designer.

Meanwhile, in the driving step, after the motor is initially driven by the drive output value so that the rail can quickly escape from the jamming state, the motor is subsequently driven with the normal output. Thus, it is possible to prevent the overload from being continuously applied to the vehicle, thereby enabling a smooth and natural movement. The time for which the motor is output to the drive output value can be variously set by the designer.

On the other hand, in the stop determination step (S200), whether or not the previous driving of the motor is normally terminated can also be performed in the same manner as the above-described determination of forced termination. That is, when the previous driving of the motor is stored as being normally terminated, this can be called to determine that the previous driving of the motor is normally terminated.

The normal termination means that the driving of the motor is terminated by operating the operation switch through the user so that the motor is no longer driven, rather than the forcible termination due to an external force such as a jamming phenomenon. Performance of the normal termination during the previous driving of the motor can mean that there is no jamming or the like on the rail. When the seat is located within the movable range of the rail, it can be meant that the driving of the motor is terminated, it is possible to mean that there is a situation where the motor output value is not required as much as the drive output value.

Therefore, when it is determined that the previous driving of the motor is normally terminated by the user in the stop determination step (S200), it is desirable to perform a sequential driving step (S300a) of controlling a plurality of turning on/off of the motor so that the driving of the motor is gradually performed. If the motor is sequentially driven in the state in which the rail is jammed, the output of the motor becomes insufficient at the time of the initial driving. Thus, the rail may not escape from the jamming or a quick response to the operation of the user may not occur. Therefore, when the forcible termination occurs during the previous driving of the motor, the motor is driven by the drive output value at the time of initial driving. However, in the case where a large output value is provided in the normal termination state, since the impact feeling recoil and the recoil sound may be generated, the sequential driving is performed for entry in a natural and smooth driving state.

Since the above-mentioned sequential driving, while controlling the turning on/off of the current applied to the motor to repeatedly drive or interrupt the motor, an overall output is lower than a case of continuously providing the power, and the output can gradually increase when the turning on/off time is gradually enlarged. When the motor is driven with the normal output after controlling a plurality of turning on/off of the motor, it is possible to naturally and smoothly enter the normal driving state. As a result, shock which may occur at the initial movement of the seat is absorbed, and the seat can smoothly move.

On the other hand, in the motor termination step (S500), when the voltage is not applied and the current value is the normal current value or less during driving of the motor, it is determined that the user operates the operation switch to intentionally terminate driving of the motor, and the driving of the motor is terminated, and a normal terminal signal can be stored. Further, the stored normal termination signal can be used in the stop determination step (S200) at the time of the next driving the motor. It is preferable that the normal current value be a current value required for the motor to output a normal output value.

According to the driving control method of the electric seat having the structure as described above, the jamming occurrence situation is distinguished from the normal termination situation, in a situation where there is no risk of jamming occurrence situation, the motor can gradually be driven, and it is possible to reduce impact feeling and recoil sound during initial driving of the motor.

In addition, in a situation where there is a risk of an occurrence of jamming, since it is possible to quickly escape from jamming, an occurrence of torque shortage phenomenon can be prevented, overheating of the motor or occurrence of failure of the electric seat can be prevented, it is possible to prevent misunderstanding of failure and improve satisfaction degree and marketability.

While the embodiments according to the present invention have been described, it will be obvious to those of ordinary skill in the art that the present invention can be embodied in other specific forms without depart from its spirit or categories, in addition to the previously described embodiments. Accordingly, the aforementioned embodiments should be considered as being illustrative rather than being limitive, and the present invention may be varied within the category of the appended claims and their equivalents, without being limited to the foregoing description, accordingly.

DESCRIPTION OF REFERENCE NUMERAL

S100: detection step
S200: stop determination step
S300a: sequential driving step
S300b: driving step
S500: motor termination step

The invention claimed is:
1. A method for controlling a motor-driven seat comprising a motor, the method comprising:
   detecting a motor drive signal of the motor-driven seat;
   when the motor drive signal is detected, determining whether a previous driving of the motor was forcibly terminated or normally terminated;
   when it is determined that the previous driving was forcibly terminated, operating the motor to produce a predetermined maximum output; and
   when it is determined that the previous driving was normally terminated, repeating turning-on and turning-off of the motor such that the motor produces a normal output that is less than the predetermined maximum output.
2. The method of claim 1, further comprising:
   detecting a current value of the motor; and
   when the current value is equal to or greater than a preset limit current value, forcibly terminating operation of the motor and storing a record of forcible termination.
3. The method of claim 2, further comprising:
   when the current value is equal to or less than a preset normal current value, normally terminating operation of the motor and storing a record of normal termination.
4. The method of claim 3, wherein determining that the previous driving was forcibly terminated is made based on the record of forcible termination, wherein that the previous driving was normally terminated is made based on the record of normal termination.

* * * * *